(12) United States Patent
Robotham

(10) Patent No.: US 7,602,797 B2
(45) Date of Patent: Oct. 13, 2009

(54) METHOD AND APPARATUS FOR REQUEST/GRANT PRIORITY SCHEDULING

(75) Inventor: Robert Elliott Robotham, Ottawa (CA)

(73) Assignee: Alcatel Lucent, Paris (FR)

( * ) Notice: Subject to any disclaimer, the term of this patent is extended or adjusted under 35 U.S.C. 154(b) by 813 days.

(21) Appl. No.: 10/677,842

(22) Filed: Oct. 2, 2003

(65) Prior Publication Data
US 2005/0073951 A1   Apr. 7, 2005

(51) Int. Cl.
H04L 12/28 (2006.01)
H04L 12/56 (2006.01)
H04J 3/16 (2006.01)
H04J 3/22 (2006.01)

(52) U.S. Cl. ............... 370/412; 370/414; 370/416; 370/418; 370/468

(58) Field of Classification Search ........... 370/412, 370/414, 416, 418, 468, 395.4, 230, 230.1, 370/236, 229, 386, 389, 392, 419, 231
See application file for complete search history.

(56) References Cited

U.S. PATENT DOCUMENTS

| | | | |
|---|---|---|---|
| 6,577,635 B2 | 6/2003 | Narayana et al. | |
| 6,747,971 B1* | 6/2004 | Hughes et al. | 370/387 |
| 6,771,596 B1* | 8/2004 | Angle et al. | 370/229 |
| 7,007,021 B1 | 2/2006 | Nadj et al. | |
| 7,042,845 B1* | 5/2006 | Naumann | 370/235 |
| 7,058,751 B2* | 6/2006 | Kawarai et al. | 710/317 |
| 7,453,898 B1* | 11/2008 | Cohen et al. | 370/414 |
| 2001/0001608 A1 | 5/2001 | Parruck et al. | |
| 2003/0103514 A1 | 6/2003 | Nam et al. | |
| 2004/0062261 A1* | 4/2004 | Zecharia et al. | 370/419 |
| 2004/0081108 A1* | 4/2004 | Kloth et al. | 370/299 |
| 2004/0246977 A1* | 12/2004 | Dove et al. | 370/395.61 |
| 2008/0159145 A1* | 7/2008 | Muthukrishnan et al. | 370/235 |

* cited by examiner

Primary Examiner—Chi H Pham
Assistant Examiner—Farah Faroul

(57) ABSTRACT

In accordance with at least one embodiment of the present invention, a method and apparatus for scheduling traffic in a communications node is provided. Line cards request communication opportunities from a switch fabric. The switch fabric issues grants for such communication opportunities in response to specific requests. By dynamically adjusting usage of such communication opportunities corresponding to such grants among requests of differing priorities and/or latency criteria, embodiments of the present invention are able to provide increased capacity utilization of switching fabric bandwidth while maximizing adherence to priority requirements and/or latency criteria.

14 Claims, 4 Drawing Sheets

401 — SENDING, TO THE SWITCH FABRIC BY A FIRST LINE CARD OF THE LINE CARDS, A FIRST REQUEST FOR TRANSMITTING A FIRST UNIT OF THE TRAFFIC OF A FIRST PRIORITY TO THE SWITCH FABRIC, THE FIRST REQUEST INDICATING A FIRST OUTPUT PORT FOR WHICH THE FIRST UNIT OF THE TRAFFIC IS DESTINED

402 — USING, BY THE FIRST LINE CARD, A FIRST GRANT RECEIVED FROM THE SWITCH FABRIC PERMITTING TRANSMISSION OF THE FIRST UNIT OF THE TRAFFIC TO THE SWITCH FABRIC AND ISSUED IN RESPONSE TO A SECOND REQUEST MADE FOR A SECOND UNIT OF THE TRAFFIC HAVING A SECOND PRIORITY LOWER THAN THE FIRST PRIORITY AND BEING DESTINED TO THE FIRST OUTPUT PORT, FOR SCHEDULING TRANSMISSION OF THE FIRST UNIT OF THE TRAFFIC TO THE SWITCH FABRIC

403 — USING A SECOND GRANT ISSUED IN RESPONSE TO THE FIRST REQUEST FOR SCHEDULING TRANSMISSION OF THE SECOND UNIT OF THE TRAFFIC TO THE SWITCH FABRIC

FIG. 4

METHOD AND APPARATUS FOR REQUEST/GRANT PRIORITY SCHEDULING

BACKGROUND OF THE INVENTION (1) Field of the Invention

The invention relates to the problem of scheduling traffic in a switch/router. More particularly, the invention relates to the problem of reducing switch latency for high priority, or real-time, traffic in a switch/router that uses a request/grant mechanism for traffic scheduling.

(2) Description of the Related Art

Communication networks typically use devices for directing the flow of data through them. Such devices are often characterized as switches and routers, which may be referred to collectively as switches/routers. A switch/router often needs to process data of different priorities according to different criteria. However, switches/routers often exhibit deficiencies that prevent them from maintain conformance with some of the particular criteria that may be desired.

Switch/routers commonly have a structure in which processing circuitry associated with ports to external lines is located on line cards, which may contain the ports and circuitry associated with one or more external lines. Among other functions, the circuitry determines the preferred destination of arriving packets. Packets are transmitted to the line card(s) associated with the preferred destination(s) by means of a switching fabric. To provide a high performance switch/router, it is necessary for the switch fabric to efficiently carry data between line cards with high data rates and low latency. In order to meet these requirements, an important class of switching fabric has emerged. It is characterized by a request/grant structure. Line cards request access to use a path through the fabric to carry data to the desired destination line card. An arbitrator associated with the switch fabric processes the requests from all line cards to determine a way to grant access to line cards to optimize fabric utilization and fairness and other criteria. Once the decision is made, access is granted to line cards to send data destined for a particular destination through the switch fabric at a particular time. The switch fabric is configured so that, at that particular time, data sent from selected inputs is transferred to selected outputs corresponding to the grants given. The latency between data being presented to the fabric and it arriving at the destination line cards is deterministic. Thus, no reordering of the data occurs within the switch fabric. Such a class of switch fabric presents an excellent example of a context to which at least one embodiment of the present invention may be beneficially applied.

FIG. 1 is a timing diagram illustrating a prior art technique for scheduling traffic in a communications node. Events occur at varying relative times along time access 101. Events are categorized as occurring during a request phase 102, the grant phase 103, and a data phase 104. During request phase 102, a line card generates requests and communicates them to a switch fabric. In the illustrated example, a line card first generates and communicates low priority (LP) request 105 then, at time 113, generates and communicates high priority (HP) requests 106.

At grant phase 103, the switch fabric grants opportunities for the line card to communicate the indicated data through the switch fabric. In the illustrated example, the switch fabric issues grant 107 corresponding to the low priority request 105 and high priority grant 108, which corresponds to high priority request 106 as shown by connection 111. However, in the illustrated example, high priority grant 108 occurs at time 114, which follows time 113 by a duration 115. Since certain latency requirements maybe placed upon high priority data, a limit may be placed on duration 115 between issuance of high priority request 106 at time 113 and issuance of high priority grant 108 at time 114. Under some circumstances, if high priority grant 108 occurs well after the issuance of high priority request 106, duration 15 may exceed such latency limits.

At data phase 104, the line card communicates the data associated with the granted requests from the line card to the switch fabric. In the illustrated example, data communication corresponding to the low priority request and grant occurs slightly after the issuance of low priority grant 107, and data communication 110 corresponding to the high priority request and grant occurs shortly after the issuance of grant 108, as illustrated by connection 112.

FIG. 1 shows an example prior art request/grant chronological sequence of low priority (LP) and high priority (HP) requests, grants and their associated data transmissions (e.g., an ATM cell).

Referring to FIG. 1, the flow of respective LP and HP request/grant/data occurrences are sequential in nature. Each request includes a priority indication, either high or low, an identifier, and a destination switch fabric output port indication (not shown). The request originates from a line card in a switch/router and is sent to a switch fabric of the switch/router for consideration. If the fabric can meet the request, typically for the transmission of one cell into the fabric, then it replies accordingly with a grant. The grant includes an indication of the same priority and identifier as the request. The line card receives the grant after some delay and then transmits the data to the switch fabric. For example, at time A a line card sends a HP request to the switch fabric, at time B the line card receives a grant in reply, and at time C the line card transmits the data to the fabric. Likewise, a similar flow occurs for an LP request sent prior to time A, with corresponding grant and data occurrences happening at times prior to times B and C, respectively.

Referring to FIG. 1, the time delay between a request and a grant received in reply can be greater than an allowable maximum delay limit for HP traffic, especially if the switch/router starts to become overloaded. Where the HP traffic carries real-time services this delay could result in an unacceptable degradation in service quality, and therefore would be desirable to avoid. Thus, a technique is needed to ensure that guaranteed bandwidth commitments are met while maximizing utilization of switching/routing capacity.

BRIEF DESCRIPTION OF THE SEVERAL VIEWS OF THE DRAWINGS

The present invention may be better understood, and its features made apparent to those skilled in the art by referencing the accompanying drawings.

FIG. 4 is a flow diagram illustrating a method for scheduling traffic in a communications node having a plurality of line cards coupled to a switch fabric in accordance with at least one embodiment of the present invention.

The use of the same reference symbols in different drawings indicates similar or identical items.

DETAILED DESCRIPTION OF THE INVENTION

In accordance with at least one embodiment of the present invention, a method and apparatus for scheduling traffic in a communications node is provided. Line cards request communication opportunities from a switch fabric. The switch fabric issues grants for such communication opportunities in response to specific requests. By dynamically adjusting usage of such communication opportunities corresponding to such grants among requests of differing priorities and/or latency criteria, embodiments of the present invention are able to provide increased capacity utilization of switching fabric bandwidth while maximizing adherence to priority requirements and/or latency criteria.

Figure 1:
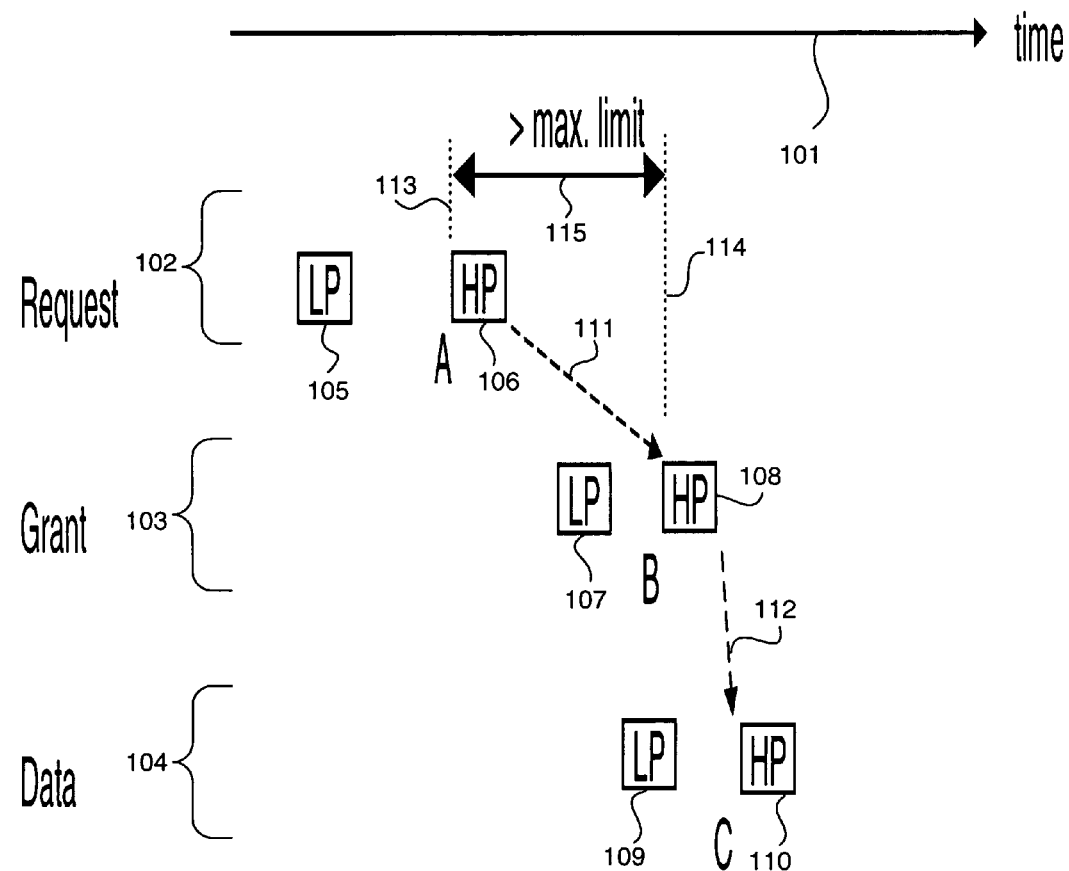
FIG. 1 is a timing diagram illustrating a prior art technique for scheduling traffic in a communications node.
Figure 2:
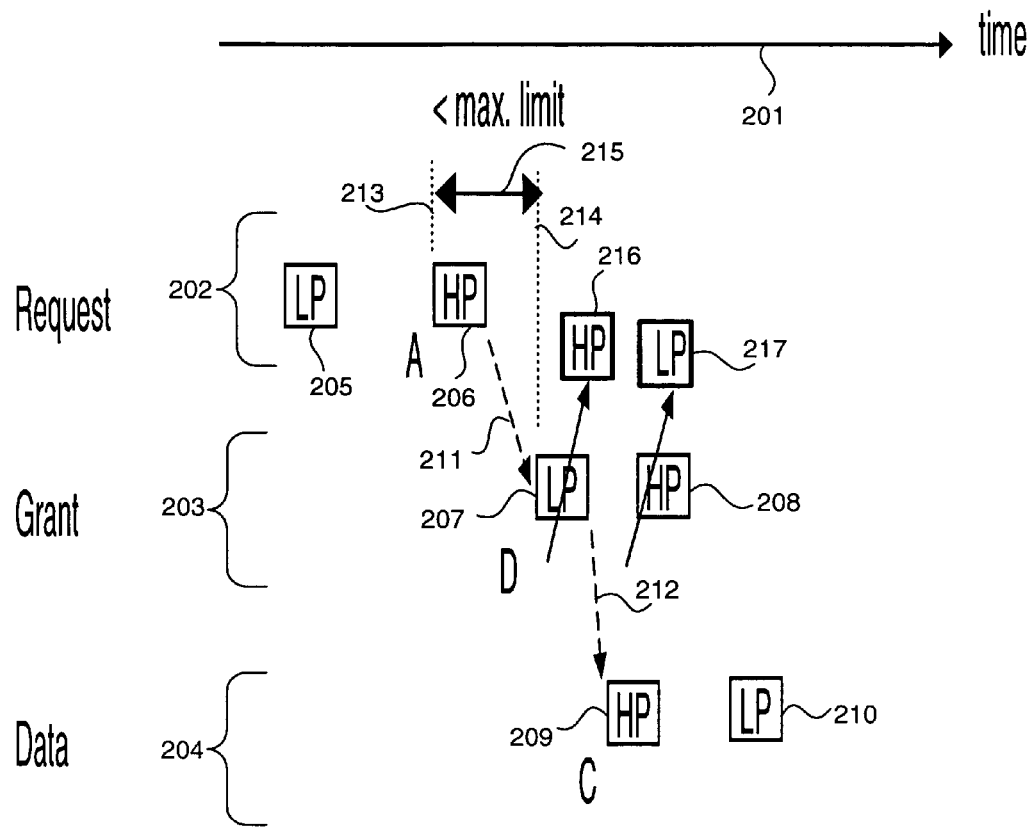
FIG. 2 is a timing diagram illustrating a method for scheduling traffic in a communications node in accordance with at least one embodiment of the present invention.

FIG. 2 is a timing diagram illustrating a method for scheduling traffic in a communications node in accordance with at least one embodiment of the present invention. Steps in the method occur at various times along time access 201. Steps may be characterized as occurring at request phase 202, grant phase 203, and data phase 204.

Figure 3:
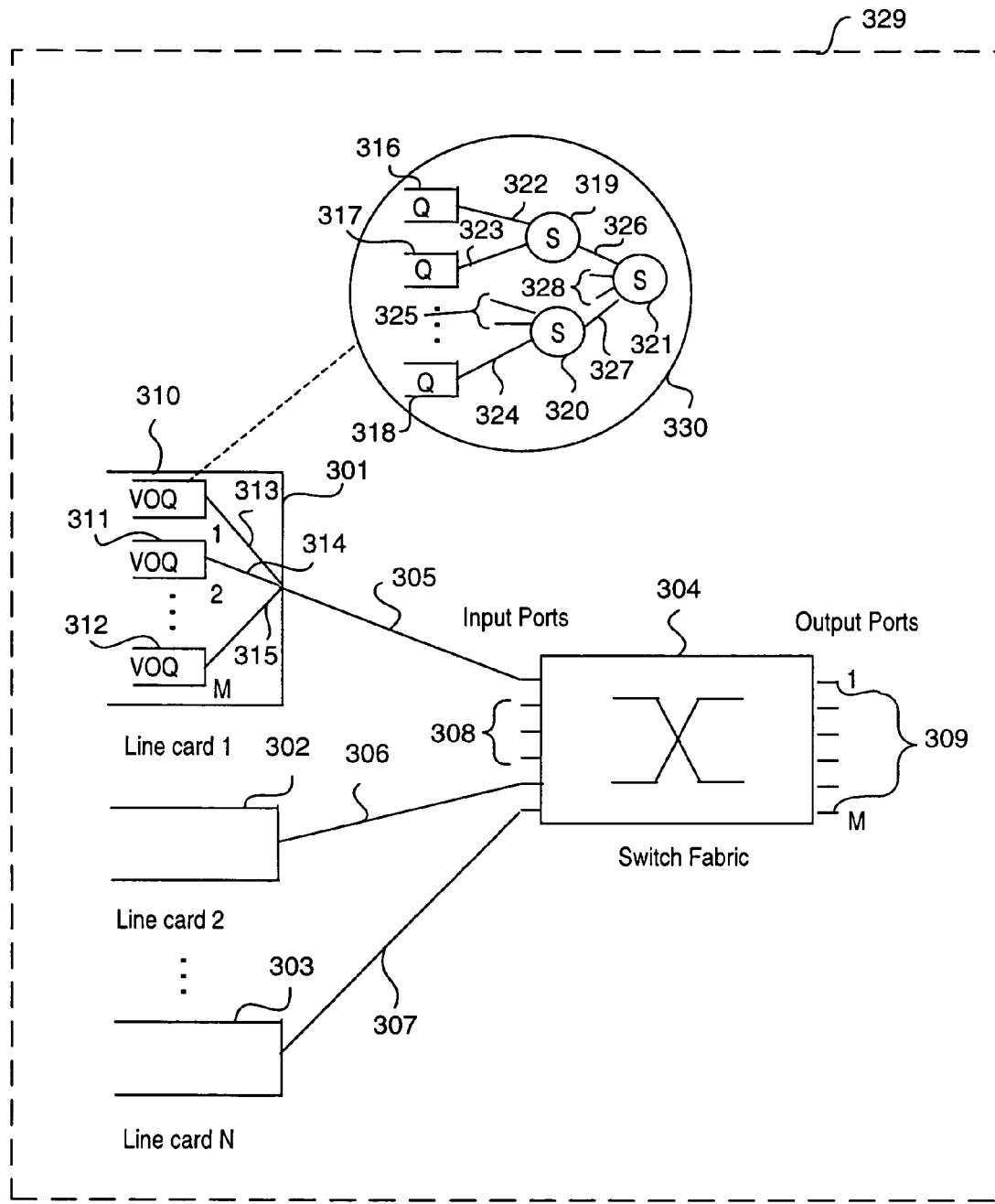
FIG. 3 is a block diagram illustrating an apparatus for scheduling traffic in accordance with at least one embodiment of the present invention.

At request phase 202, a line card, such as line card 301 of FIG. 3 generates and communicates requests for data communication to a switch fabric, such as switch fabric 304 of FIG. 3. In the illustrated example, the line card first generates and communicates low priority request 205, then, at time 213, generates high priority request 206.

At grant phase 203, the switch fabric generates and communicates a grant of an opportunity for the line card to use the switch fabric for data communication. In the illustrated example, the switch fabric generates low priority grant 207 at time 214 and communicates it back to the line card. Then, the switch fabric generates high priority grant 208 and transmits it back to the line card.

However, the line card maintains the latency requirements of the high priority data by utilizing low priority grant 207 as a high priority grant 216 and utilizing high priority grant 208 as a low priority grant 217. Thus, the duration 215 between time 213 at which the high priority request 206 is made and time 214 at which high priority grant 216 occurs is maintained at less than the applicable time limit.

At data phase 204, the line card communicates the data corresponding to the grants through the switch fabric. In the illustrated example, the line card communicates high priority data 209 shortly after high priority grant 216, as illustrated by connection 212, and communicates low priority data 210 shortly after low priority grant 217.

A HP request 206 can take a grant 207 for an LP request 205 if the requests are for the same switch fabric output port. Afterward, if a HP grant 208 for that port is sent in reply of the HP request 206 then the HP grant 208 can be used by the LP request 205. For example, an HP request 206 is sent at time 213 and an LP grant 207, received at time 215, is used for transmission of HP data 209 to the fabric. In this way, the time delay 215 between an HP request 206 and grant 216 is reduced such that it remains within the maximum delay limit for HP traffic.

The line card can make the grant substitution (e.g., using low priority grant 207 as high priority grant 216 and using high priority grant 208 as low priority grant 217) in a number of ways. For example, the line card can keep track of which requests it has pending with the switch matrix and there respective priorities. As grants are received, the line card can pass high priority traffic in response to the first available grants and then, after the high priority traffic has been passed, pass low priority traffic in response to subsequent grants. As another example, the line card can keep track of latency criteria, such as any limits imposed on duration 215, and select among traffic to ensure that latency criteria are met, or, if not all latency criteria can be met, select among traffic so as to either maximize the number of latency criteria that are met or ensure that latency criteria designated as most important are met. Also, the two previous examples may be combined so that higher priority pending traffic can be passed before lower priority pending traffic, and the pending traffic can be passed so as to maximize opportunities to satisfy latency criteria.

FIG. 3 is a block diagram illustrating an apparatus for scheduling traffic in accordance with at least one embodiment of the present invention. A communication node 329 may be implemented as a switch/router comprising a plurality (N) of line cards 301, 302, and 303 coupled to the switch fabric 304. Line card 301 is coupled to switch fabric 304 via connection 305. Line card 302 is coupled to switch fabric 304 via connection 306. Line card 303 is coupled to switch fabric 304 via connection 307. Additional line cards may be coupled to switch fabric 304 via connections 308. Switch fabric 304 provides output ports 309.

Each line card comprises a plurality (M) of virtual output queues (VOQ) 310, 311, 312, with each of VOQ 310, 311, and 312 corresponding to a respective output port 309 of the switch fabric. VOQ 310 provides an output 313, which is coupled to connection 305. VOQ 311 provides an output 314, which is coupled to connection 305. VOQ 312 provides an output 315, which is coupled to connection 305.

Each output queue 310, 311, 312 is preferably configured to service a queue structure 330, which is depicted as an inset diagram to provide illustration in greater detail. Queue structure 330 comprises a plurality of input queues (Q) 316, 317, 318 and a hierarchical arrangement of schedulers (S) 319, 320, 321 in order to support multiple classes of traffic, each class having a unique priority level. Input queue 316 is coupled to scheduler 319 via connection 322. Input queue 317 is coupled to scheduler 319 via connection 323. Additional input queues may also be coupled to scheduler 319. Input queue 318 is coupled to scheduler 320 via connection 324. Additional input queues may also be coupled to scheduler 320 via connections 325. Scheduler 319 is coupled to scheduler 321 via connection 326. Scheduler 320 is coupled to scheduler 321 via connection 327. Additional schedulers may be coupled to scheduler 321 via connections 328.

To support multiple traffic priority levels the switch/router architecture of FIG. 3, at least one embodiment of the invention provides a means pairing higher priority requests with lower priority grants of like VOQs (i.e. like fabric output port destinations) over a range of traffic priority levels. Basically, a request of a particular priority level and VOQ can be paired with a grant of any lower priority level and same VOQ.

VOQs may also correspond to a particular class of traffic associated with a respective output port, that is, there may be more than one VOQ associated with a respective output port. In this case, VOQs of different priorities with like fabric output port destinations may be grouped and grants transferred between the VOQs.

Furthermore the basis of at least one embodiment of the invention is that the priority of the data sent in response to a grant does not need to correspond to the priority of that grant, and hence the request. As a result, there is no need for the priority of the requests to match the priority of the data present and the priority can be determined by other means. Through this, at least one embodiment of the invention can be used to ensure that guaranteed bandwidth commitments are met while maximizing utilization of switching/routing capacity. For example, where X Mbps of bandwidth are guaranteed by the switch/router (e.g. via connection admission control—CAC), each line card sends HP requests for only its portion of the X Mbps of guaranteed bandwidth, while LP requests are sent for all other traffic. Since LP grants can be taken by HP requests, by the same VOQ, the ability of the switch/router to meet bandwidth guarantees is not affected by the LP traffic.

FIG. 4 is a flow diagram illustrating a method for scheduling traffic in a communications node having a plurality of line cards coupled to a switch fabric in accordance with at least one embodiment of the present invention. The method begins in step 401 by sending, to the switch fabric by a first line card of the line cards, a first request for transmitting a first unit of the traffic of a first priority to the switch fabric. The first request indicates a first output port for which the first unit of the traffic is destined. The method continues in step 402 by using, by the first line card, a first grant received from the switch fabric permitting transmission of the first unit of the traffic to the switch fabric and issued in response to a second request made for a second unit of the traffic having a second priority lower than the first priority and being destined to the first output port, for scheduling transmission of the first unit of the traffic to the switch fabric.

The method continues in step 403 by using a second grant issued in response to the first request for scheduling transmission of the second unit of the traffic to the switch fabric. The method may optionally be practiced such that the first priority and the second priority are selected from a plurality of priorities corresponding to a respective plurality of service classes. The method may also optionally be practiced such that the first line card sends the first request after the second request. The method may also optionally be practiced such that the first line card sends a first set of requests of a highest priority of a plurality of priorities, with the first set of requests corresponding to a first quantity of the traffic in an amount of guaranteed traffic flow serviced by the first line card, and sends a second set of requests of a lower priority of the priorities for a second quantity of the traffic.

At least one embodiment of the present invention is useful and beneficial in that it offers reduced latency for high priority, real-time, traffic in switches/routers having a fixed latency switching fabric. At least one embodiment of the present invention is useful and beneficial in that it enables increased capacity utilization for low priority traffic while maintaining latency guarantees for high priority traffic.

To increase the cost effectiveness of a switch/router, it is desirable to increase its capacity utilization. However, QoS guarantees should be maintained while increasing capacity utilization. Among these, ensuring that switch latency for high priority, real-time, traffic is kept within specified limits is essential. At least one embodiment of the present invention provides this capability while enabling additional capacity to be used for lower priority traffic. Therefore, at least one embodiment of the present invention increases the cost-effectiveness and utility of switching/routing platforms.

Thus, a method and apparatus for request/grant priority scheduling has been presented. Although the invention has been described using certain specific examples, it will be apparent to those skilled in the art that the invention is not limited to these few examples. Other embodiments utilizing the inventive features of the invention will be apparent to those skilled in the art, and are encompassed herein.

What is claimed is:

1. A method for scheduling traffic in a communications node having a plurality of line cards coupled to a switch fabric, the method comprising the steps of:
   a) sending, to the switch fabric by a first line card of the line cards, a first request for transmitting a first unit of the traffic of a first priority to the switch fabric, the first request indicating a first output port for which the first unit of the traffic is destined; and
   b) using, by the first line card, a first grant received from the switch fabric permitting transmission of the first unit of the traffic to the switch fabric and issued in response to a second request made for a second unit of the traffic having a second priority lower than the first priority and being destined to the first output port, for scheduling transmission of the first unit of the traffic to the switch fabric.

2. The method of claim 1 further comprising the step of:
   using a second grant issued in response to the first request for scheduling transmission of the second unit of the traffic to the switch fabric.

3. The method of claim 1 wherein the first priority and the second priority are selected from a plurality of priorities corresponding to a respective plurality of service classes.

4. The method of claim 1 wherein the first line card sends the first request after the second request.

5. The method of claim 1 wherein the first line card sends a first set of requests of a highest priority of a plurality of priorities, with the first set of requests corresponding to a first quantity of the traffic in an amount of guaranteed traffic flow serviced by the first line card, and sends a second set of requests of a lower priority of the priorities for a second quantity of the traffic.

6. The method of claim 1 wherein the using, by the first line card, the first grant comprises:
   performing grant substitution.

7. Apparatus for scheduling traffic in a communications node having a plurality of line cards coupled to a switch fabric comprising:
   a first line card of the plurality of line cards, the first line card configured to send requests for transmitting units of the traffic of specified priorities to the switch fabric and to receive grants permitting transmission of the units of the traffic to switch fabric, the first line card further configured to utilize a first grant of the grants corresponding to a first request of the requests, wherein the first request is of a lower priority than a second request of the requests, for transmitting a first unit of the traffic corresponding to the second request to the switch fabric.

8. The apparatus of claim 7 wherein the first line card is further configured to utilize the first grant for transmitting the first unit of the traffic to conform to a latency criterion pertaining to a first data stream comprising the first unit of the traffic.

9. The apparatus of claim 7 wherein the first line card is further configured to utilize a second grant of the grants corresponding to the second request for transmitting a second unit of traffic corresponding to the first request to the switch fabric.

10. The apparatus of claim 9 wherein the first line card is further configured to issue the first request prior to the second request.

11. Apparatus for scheduling traffic in a communications node having a plurality of line cards coupled to a switch fabric comprising:
   a first line card of the plurality of line cards, the first line card further comprising:
      a first means configured to send requests for transmitting units of the traffic of specified priorities to the switch fabric and to receive grants permitting transmission of the units of the traffic to switch fabric; and
      a second means configured to utilize a first grant of the grants corresponding to a first request of the requests, wherein the first request is of a lower priority than a second request of the requests, for transmitting a first unit of the traffic corresponding to the second request to the switch fabric.

12. The apparatus of claim 11 wherein the second means is further configured to utilize the first grant for transmitting the first unit of the traffic to conform to a latency criterion pertaining to a first data stream comprising the first unit of the traffic.

13. The apparatus of claim 11 wherein the second means is further configured to utilize a second grant of the grants corresponding to the second request for transmitting a second unit of traffic corresponding to the first request to the switch fabric.

14. The apparatus of claim 13 wherein the first means is further configured to issue the first request prior to the second request.

* * * * *

UNITED STATES PATENT AND TRADEMARK OFFICE
CERTIFICATE OF CORRECTION

PATENT NO.       : 7,602,797 B2                                   Page 1 of 1
APPLICATION NO.  : 10/677842
DATED            : October 13, 2009
INVENTOR(S)      : Robert Elliott Robotham It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1107 days.

Signed and Sealed this

Fifth Day of October, 2010

David J. Kappos
*Director of the United States Patent and Trademark Office*